US010435521B2

(12) United States Patent
Tinkl et al.

(10) Patent No.: US 10,435,521 B2
(45) Date of Patent: Oct. 8, 2019

(54) POLYMER COMPOSITION BY CONTINUOUS FILLER SLURRY EXTRUSION

(71) Applicants: Omya International AG, Oftringen (CH); Fraunhofer-Gesellschaft zur Förderung der Angewandten Forschung E.V., München (DE)

(72) Inventors: Michael Tinkl, Gipf-Oberfrick (CH); Martin Brunner, Wallbach (CH); René Burkhalter, Herzogenbuchsee (CH); Tazio Fornera, Zofingen (CH); Giuseppe Schirosi, Buchs (CH); Rudolf Pfaendner, Rimbach (DE); Jan Barth, Siegsdorf (DE); Bernd Dillmann, Weiterstadt (DE); Harald Dörr, Messel (DE)

(73) Assignees: OMYA INTERNATIONAL AG, Oftringen (CH); FRAUNHOFER-GESELLSCHAFT ZUR FORDERUNG DER, Munich (DE)

( * ) Notice: Subject to any disclaimer, the term of this patent is extended or adjusted under 35 U.S.C. 154(b) by 0 days.

(21) Appl. No.: 15/038,620

(22) PCT Filed: Dec. 17, 2014

(86) PCT No.: PCT/EP2014/078185
§ 371 (c)(1),
(2) Date: May 23, 2016

(87) PCT Pub. No.: WO2015/097031
PCT Pub. Date: Jul. 2, 2015

(65) Prior Publication Data
US 2016/0289397 A1    Oct. 6, 2016

Related U.S. Application Data

(60) Provisional application No. 61/943,586, filed on Feb. 24, 2014.

(30) Foreign Application Priority Data

Dec. 23, 2013    (EP) .................................... 13199279

(51) Int. Cl.
| | | |
|---|---|---|
| *C08J 3/20* | (2006.01) |
| *C08J 3/205* | (2006.01) |
| *B29C 48/04* | (2019.01) |
| *B29C 48/00* | (2019.01) |
| *B29C 48/29* | (2019.01) |
| *B29C 48/285* | (2019.01) |
| *B29B 9/06* | (2006.01) |
| *B29B 9/12* | (2006.01) |
| *C08J 5/18* | (2006.01) |
| *C08K 3/26* | (2006.01) |
| *B29C 48/08* | (2019.01) |
| *B29C 48/40* | (2019.01) |
| *B29K 509/00* | (2006.01) |
| *B29K 23/00* | (2006.01) |

(52) U.S. Cl.
CPC ............. *C08J 3/2056* (2013.01); *B29B 9/065* (2013.01); *B29B 9/12* (2013.01); *B29C 48/022* (2019.02); *B29C 48/04* (2019.02); *B29C 48/288* (2019.02); *B29C 48/29* (2019.02); *C08J 5/18* (2013.01); *C08K 3/26* (2013.01); *B29C 48/0018* (2019.02); *B29C 48/08* (2019.02); *B29C 48/297* (2019.02); *B29C 48/40* (2019.02); *B29K 2023/00* (2013.01); *B29K 2023/0625* (2013.01); *B29K 2509/00* (2013.01); *C08J 2323/06* (2013.01); *C08J 2323/08* (2013.01); *C08K 2003/265* (2013.01); *C08K 2201/003* (2013.01)

(58) Field of Classification Search
CPC .......................... C08J 3/2056; B29C 47/1063
USPC ....................................................... 523/333
See application file for complete search history.

(56) References Cited

U.S. PATENT DOCUMENTS

| | | | | |
|---|---|---|---|---|
| 3,668,169 A | * | 6/1972 | Brinkman, Jr. .......... | C08J 3/201 523/333 |
| 5,073,320 A | | 12/1991 | Sterzel | |
| 5,091,453 A | | 2/1992 | Davidson et al. | |
| 6,239,196 B1 | | 5/2001 | Bussi et al. | |
| 6,436,453 B1 | | 8/2002 | van Lengerich et al. | |
| 6,666,953 B1 | | 12/2003 | Gane et al. | |

(Continued)

FOREIGN PATENT DOCUMENTS

| | | |
|---|---|---|
| CH | 415041 A | 6/1966 |
| EP | 0418728 A2 | 3/1991 |
| EP | 0477634 A2 | 4/1992 |

(Continued)

OTHER PUBLICATIONS

The International Search Report dated Mar. 3, 2015 for PCT Application No. PCT/EP2014/078185.

(Continued)

*Primary Examiner* — Edward J Cain
(74) *Attorney, Agent, or Firm* — ALGM LLP; Harry J. Guttman

(57) ABSTRACT

An inventive process for the production of a polymer composition is provided, said process comprising the incorporation of a filler into a polymer material, wherein said polymer material during incorporation of the filler is in at least partially molten state and wherein said filler is incorporated as a slurry.

26 Claims, 1 Drawing Sheet

(56) References Cited

U.S. PATENT DOCUMENTS

2011/0040011 A1 2/2011 Feichtinger et al.
2011/0305862 A1 12/2011 Rachwal

FOREIGN PATENT DOCUMENTS

| EP | 0478987 A2 | 4/1992 |
|---|---|---|
| EP | 0877044 A1 | 11/1998 |
| EP | 2154177 A2 | 2/2010 |
| EP | 2264108 A1 | 12/2010 |
| EP | 2264109 A1 | 12/2010 |
| EP | 2371766 A1 | 10/2011 |
| EP | 2447213 A1 | 5/2012 |
| EP | 2524898 A1 | 11/2012 |
| GB | 1049773 | 11/1966 |
| WO | 2010103019 A1 | 9/2010 |
| WO | 2013/120934 A1 | 8/2013 |

OTHER PUBLICATIONS

The Written Opinion of International Searching Authority dated Mar. 3, 2015 for PCT Application No. PCT/EP2014/078185.
Liu et al. "A novel approach in preparing polymer / nano-CaCO3 composites." Chem. Eng. China 2008, 2(1): 115-122.

* cited by examiner

A)
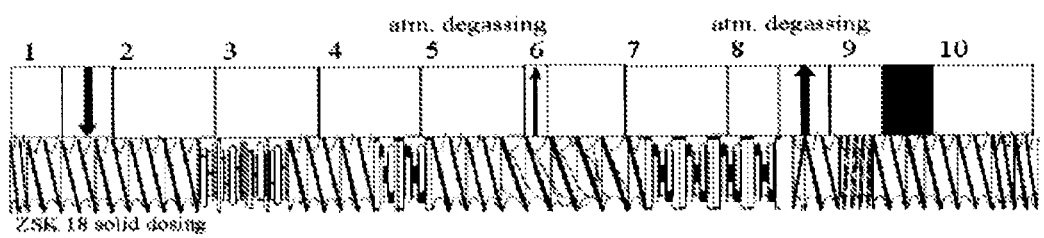
B)
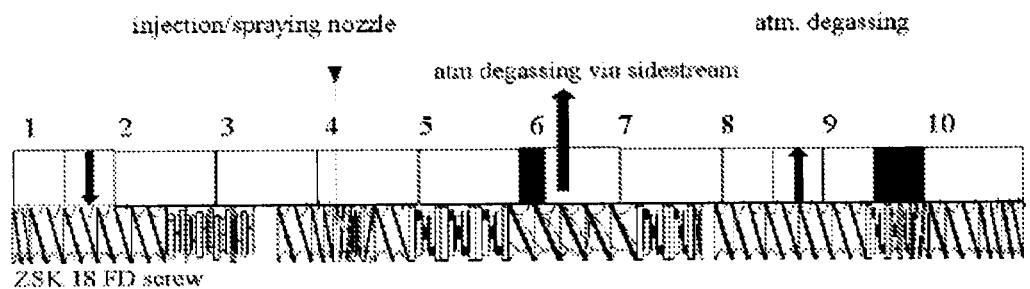

POLYMER COMPOSITION BY CONTINUOUS FILLER SLURRY EXTRUSION

CROSS-REFERENCE TO RELATED APPLICATIONS

This is a U.S. national phase of PCT Application No. PCT/EP2014/078185, filed Dec. 17, 2014, which claims priority to European Application No. 13199279.4, filed Dec. 13, 2013 and U.S. Provisional Application No. 61/943,586, filed Feb. 24, 2014.

The present invention relates to a process for the continuous production of a polymer composition and the use of said polymer composition.

Fillers and in particular mineral fillers are often used in the manufacture of polymer products made from polymers, such as polyethylene (PE), polypropylene (PP), polyurethane (PU), or polyvinylchloride (PVC) in order to, for example, lower the consumption of more expensive materials, improve the properties of the materials, or reduce thermal shrinkage.

Increasing costs for the production of polymer products lead to the development of more economic methods for the provision of polymer compositions. For example, a polymer composition with high filler content, i.e. a polymer masterbatch (sometimes also referred to as a polymer concentrate), may be extruded together with another polymer material in order to increase the filler content of the obtained polymer product.

Fillers are frequently selected from natural or synthetic materials, such as calcium carbonate containing minerals in general, chalk, limestone, marble, dolomite, barium sulfate, talc, kaolin, clay, titan dioxide or mica.

In a conventional process for the production of a polymer composition, a polymer material and a filler are usually mixed in a separate mixing step prior to compounding of the resulting dry blend, for example, by use of an extruder.

In some cases, the filler may also be incorporated into the polymer matrix by use of a side feeder of an extruder which allows for the incorporation of filler into a molten polymer matrix. However, premixing is essential in many cases in order to provide a homogeneous mixture of the resulting composition.

Several methods for the production of polymer compositions have been previously described in the art.

For example, CH 415 041 A discloses a process for the manufacture of pigmented polyethylene or polypropylene comprising mixing the polyolefin with a liquid pigment dispersion containing the pigment in finely dispersed form and then removing the liquid by drying, so that the polyolefin is maintained in powder form.

U.S. Pat. No. 6,239,196 B1 relates to a process for the preparation of a composition to be extruded comprising a polymer and a filler of solid particles comprising a stage of mixing the filler of solid particles with particles or granules of the polymer below the melting point of said polymer.

However, the methods described in the prior art involve the addition of filler to a polymer material at a temperature which is below the melting point of said polymer material. Typically, such methods require drying of the resulting mixture prior to feeding the corresponding dry mixture into the extruder. Furthermore, the prior art methods often also require a separate and costly mixing step upstream from the mixing device or extruder and may thus only be carried out in a discontinuous manner.

Thus, there is a need to provide a process which may reduce or avoid the foregoing economic and technical drawbacks. Such process should, e.g., be a continuous production process.

It is thus an object of the present invention to provide a more economic process for the production of a polymer composition. Another object may be seen in the provision of a process allowing for the continuous production of a polymer composition.

It is yet another object to provide a process for the production of a polymer composition according to which costly drying and mixing procedures may be avoided.

One or more of the foregoing and other objects are solved by the subject-matter as defined herein in the independent claims.

BRIEF DESCRIPTION OF THE DRAWINGS

FIGS. 1A-1B: FIG. 1A) shows an extruder for solid dosing (Coperion ZSK-18, Coperion GmbH, Germany). FIG. 1B) shows an extruder for FD screw (Coperion ZSK-18, Coperion GmbH, Germany).

According to one aspect of the present invention, a process for the continuous production of a polymer composition is provided, the process comprising the steps of:
 (a) providing a filler;
 (b) providing a polymer material;
 (c) forming a polymer composition comprising the filler of step (a) and the polymer material of step (b) by use of an extruder;
characterized in that said process comprises the incorporation of said filler into said polymer material, wherein said polymer material during incorporation of the filler is in at least partially molten state and wherein said filler is incorporated as a slurry.

According to another aspect, the present invention relates to the provision of a polymer composition obtainable by the inventive process.

According to yet another aspect, the present invention relates to a polymer product comprising said polymer composition.

According to yet another aspect, the present invention relates to the use of said polymer composition in the manufacture of polymer products, wherein said polymer products preferably are selected from one or more of flexible packaging for industrial and consumer applications, including roll stocks, bags, pouches, labels, wraps, liddings, shrink sleeves and stretch films; rigid packaging for industrial and consumer applications including plastic bottles, cups and containers; building and construction materials, including pipes and conduits, cladding and profiles, insulations, seals and gaskets, geotextiles; agriculture and horticulture materials including greenhouse materials, mulch films, tunnels, silages, bale wraps, boxes and crates; transportation and automotive applications including interior parts, such as instrument and door panels, consoles, pillars and seating; exterior parts, such as bumper fascia, fenders, tailgates as well as under the hood applications including air ducts, air intake manifolds, radiators and cooling hoses; electrical and electronic applications including CD players, DVD systems, personal computers and TV sets, notebooks, tablets, smartphones, cookers, refrigerators and freezers, washing machines, dishwashers, tools and office equipment; medical and health applications including disposable caps, gowns, masks, scrub suits and shoe covers, drapes, wraps and packs, sponges, dressings and wipes, bed linen, contamination control gowns, examination gowns, lab coats, isolation gowns, diagnostic medical machinery and medical devices; personal care products including absorbent hygiene products (AHP), baby diapers, feminine hygiene products and adult incontinence products, wipes, skin care products, depilatory strips; household and furniture products, including wood composites, decorative foils, floor coverings, flooring, kitchen ware, cleaners, pet care, lawn and garden articles; toys, sports and leisure articles including playhouses, building kits, play vehicles, sports and fitness devices, shoes, clothing and sportswear, safety equipment (helmets, kneepads), sports equipment, and suit cases.

Still another aspect of the present invention relates to the use of a filler in form of a slurry for the production of a polymer composition by incorporating, within an extruder, said slurry into a polymer material being in at least partially molten state.

Advantageous embodiments of the inventive process are defined in the corresponding subclaims.

According to one embodiment of the inventive process, the filler slurry has a solids content in the range from 10 to 90 wt.-%, preferably from 15 to 88.5 wt.-% and more preferably from 20 to 78 wt.-%, based on the total weight of said filler slurry.

According to another embodiment of the inventive process, the filler content of the polymer composition is in the range from 0.5 to 90 wt.-%, preferably from 5 to 85 wt.-%, more preferably from 10 to 80 wt.-% and most preferably from 20 to 75 wt.-%, based on the total weight of said polymer composition.

According to yet another embodiment of the inventive process, the filler provided in step (a) is selected from the group consisting of a calcium carbonate containing mineral, chalk, limestone, marble, dolomite, barium sulfate, talc, kaolin, clay, mica, titan dioxide or mixtures thereof, wherein the filler preferably is a calcium carbonate containing mineral.

According to a preferred embodiment of the inventive process, the filler provided in step (a) is a ground calcium carbonate (GCC), a precipitated calcium carbonate (PCC), a modified calcium carbonate (MCC), or a mixture thereof.

According to another preferred embodiment of the inventive process, the precipitated calcium carbonate (PCC) is ground prior to incorporation into the polymer material.

According to yet another preferred embodiment of the inventive process, the filler provided in step (a) comprises a coated filler, an uncoated filler, or a mixture of both, wherein the filler preferably comprises an uncoated filler and more preferably comprises an uncoated calcium carbonate containing mineral filler.

According to one embodiment of the inventive process, the filler provided in step (a) has a weight median particle size $d_{50}$ in the range from 0.001 to 50 µm, preferably from 0.05 to 10 µm, more preferably from 0.07 to 5 µm and most preferably from 0.1 to 2.5 µm.

According to another embodiment of the inventive process, the filler provided in step (a) has a particle top cut $d_{98}$ in the range from 0.25 to 50 µm, preferably from 0.35 to 30 µm and more preferably from 0.4 to 15 µm.

According to yet another embodiment of the inventive process, the polymer material provided in step (b) comprises a thermoplastic resin, wherein the thermoplastic resin preferably comprises a polyolefin.

According to a preferred embodiment of the inventive process, the polyolefin is selected from the group of homo- and/or copolymers of polyethylene, homo- and/or copolymers of polypropylene, homo- and/or copolymers of polybutylene, or mixtures thereof.

According to another preferred embodiment of the inventive process, the extruder is a twin-screw extruder, wherein the screws preferably are co-rotating or counter-rotating screws and more preferably are co-rotating screws.

According to one embodiment of the present invention, the polymer composition obtainable by the inventive process has a water content which is equal to or less than 2 wt.-%, preferably equal to or less than 1 wt.-% and more preferably equal to or less than 0.5 wt.-%, based on the total weight of said polymer composition.

According to one embodiment of the present invention, the polymer composition obtainable by the inventive process is used in the manufacture of polymer products, wherein said polymer products preferably comprise polyolefin articles, such as woven fibers, non-woven fibers, profiles, cables, films, or molded products.

According to one embodiment of the use of a filler in fox in of a slurry, the slurry has a solids content in the range from 10 to 90 wt.-%, preferably from 15 to 88.5 wt.-% and more preferably from 20 to 78 wt.-%, based on the total weight of said slurry.

According to another embodiment of said use, the filler content of the polymer composition is in the range from 0.5 to 90 wt.-%, preferably from 5 to 85 wt.-%, more preferably from 10 to 80 wt.-% and most preferably from 20 to 75 wt.-%, based on the total weight of said polymer composition.

According to yet another embodiment of said use, the filler is selected from the group consisting of a calcium carbonate containing mineral, chalk, limestone, marble, dolomite, barium sulfate, talc, kaolin, clay, mica, titan dioxide or mixtures thereof, wherein the filler preferably is a calcium carbonate containing mineral.

According to yet another embodiment of said use, the filler is a ground calcium carbonate (GCC), a precipitated calcium carbonate (PCC), a modified calcium carbonate (MCC), or a mixture thereof.

According to one embodiment of said use, the precipitated calcium carbonate (PCC) is ground prior to incorporation into the polymer material.

According to another embodiment of said use, the filler comprises a coated filler, an uncoated filler, or a mixture of both, wherein the filler preferably comprises an uncoated filler and more preferably comprises an uncoated calcium carbonate containing mineral filler.

According to another embodiment of said use, the filler has a weight median particle size $d_{50}$ in the range from 0.001 to 50 µm, preferably from 0.05 to 10 µm, more preferably from 0.07 to 5 µm and most preferably from 0.1 to 2.5 µm.

According to yet another embodiment of said use, the filler has a particle top cut $d_{98}$ in the range from 0.25 to 50 µm, preferably from 0.35 to 30 µm and more preferably from 0.4 to 15 µm.

According to another embodiment of said use, the polymer material comprises a thermoplastic resin, wherein the thermoplastic resin preferably comprises a polyolefin.

In some embodiments of said use, the polyolefin is selected from the group of homo- and/or copolymers of polyethylene, homo- and/or copolymers of polypropylene, homo- and/or copolymers of polybutylene, or mixtures thereof.

According to another embodiment of said use, the extruder is a twin-screw extruder, wherein the screws preferably are co-rotating or counter-rotating screws and more preferably are co-rotating screws.

It should be understood that for the purposes of the present invention, the following terms have the following meanings:

The term "polymer composition" refers to a composite material comprising at least one additive (e.g., at least one filler) and at least one polymer material which may be used in the production of a polymer product. A polymer composition having a relatively high filler content (e.g., 35 to 90 wt.-% based on the total weight of the polymer composition), also referred to as a "polymer masterbatch", may be added to a unfilled or lowly filled polymer during processing in order to achieve higher filler contents. Nevertheless, a polymer composition having a relatively low filler content (e.g., 0.5 to 45 wt.-% based on the total weight of the polymer composition), also referred to as a "polymer compound", may also be used directly in the production of a polymer product. Accordingly, the term "polymer composition" as used herein comprises both, polymer masterbatches and polymer compounds.

The term "filler" in the meaning of the present invention refers to substances which may be added to materials, such as, polymers, elastomers, paints, or adhesives, e.g. to lower the consumption of more expensive materials or to improve material or mechanical properties of the resulting products. The person skilled in the art very well knows the typical mineral fillers used in the respective field.

The term "mineral" as used herein encompasses a biogenic and solid material with an ordered atomic structure.

The term "slurry" in the meaning of the present invention refers to a suspension comprising at least one insoluble solid and at least one liquid, e.g. water. Said suspension may optionally comprise further additives. Slurries usually contain large amounts of solid and are more viscous and generally of higher density than the liquid from which they are formed. It is accepted in the art that the general term "dispersion" inter alia covers "suspensions" as a specific type of dispersion.

A "polymer material" as used in this application comprises homopolymers, copolymers, such as, for example, block, graft, random and alternating copolymers, heterophasic copolymers and random heterophasic copolymers as well as polymer blends, modifications, or mixtures thereof. The term polymer material as used herein may likewise comprise recycled polymer materials. The content of recycled polymers in the polymer material may be in the range from 0.01 to 100 wt.-%.

The "extruder" according to the present application may be any device which is suitable for compounding one or more polymer with one or more additive, e.g. with a mineral filler.

"Ground calcium carbonate" (GCC) in the meaning of the present invention is a calcium carbonate obtained from natural sources, such as limestone, marble, calcite, or chalk, and processed through a wet and/or dry treatment, such as grinding, screening and/or fractionation, for example, by a cyclone or classifier.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate, for example, in an aqueous environment. PCC may be vaterite, calcite or aragonite. PCCs are described, for example, in EP 2 447 213 A1, EP 2 524 898 A1, EP 2 371 766 A1, or unpublished European patent application No. 12 164 041.1.

"Modified calcium carbonate" (MCC) in the meaning of the present invention may feature a natural ground or precipitated calcium carbonate with an internal structure modification or a surface-reaction product thereof, e.g. a surface-reacted calcium carbonate as described in U.S. Pat. No. 6,666,953, EP 2 264 109 A1 and EP 2 264 108 A1.

The term "coated" in the meaning of the present invention refers to any coating of a mineral filler, for example, with fatty acids, surfactants, siloxanes, polymers, or mixtures thereof, preferably in order to hydrophobize the surface of said mineral filler. Consequently, the term "uncoated" refers to the absence of such hydrophobic surface layers.

Throughout the present document, the "particle size" of the filler material is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all particles are bigger or smaller than this particle size. For the purpose of the present invention, the particle size is specified as weight median particle size $d_{50}$ unless indicated otherwise. For determining the weight median particle size $d_{50}$ value or the top cut particle size $d_{98}$ value a Sedigraph 5100 or 5120 device from the company Micromeritics, USA, can be used.

Where an indefinite or definite article is used when referring to a singular noun, e.g. "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" though such a limited understanding is always included by the terms "obtained" or "defined" as a preferred embodiment.

According to the present invention the process for the continuous production of a polymer composition comprises the steps of:
(a) providing a filler,
(b) providing a polymer material;
(c) forming a polymer composition comprising the filler of step (a) and the polymer material of step (b) by use of an extruder;

characterized in that said process comprises the incorporation of said filler into said polymer material, wherein said polymer material during incorporation of the filler is in at least partially molten state and wherein said filler is incorporated as a slurry.

The inventors surprisingly found that the filler provided in step (a) of the inventive process may be incorporated as a slurry, i.e. as a mixture of solid filler and a liquid, usually water. For this purpose, the filler slurry is suitably injected directly into the injection zone of an extruder. In the injection zone of the extruder, the polymer provided in step (b) is in an at least partially molten state allowing for a sufficient mixing of the injected filler slurry with the polymer melt. After mixing, any liquid (e.g., water) is allowed to vaporize through one or more atmospheric or vacuum vents according to the inventive process. The polymer composition obtainable by the inventive process has excellent material properties, such as a very good dispersion of the filler in the polymer matrix, and may be free or essentially free of water.

In the following, preferred embodiments of the inventive process for the continuous production of a polymer composition will be set out in more detail.

It is to be understood that these technical details and embodiments also apply to the polymer composition, to polymer products comprising the polymer composition, to the use of said polymer composition and to the use of a filler in form of a slurry in a process for the production of such polymer compositions.

Characterization of Step (a):

According to step (a) of the inventive process for the continuous production of a polymer composition, a filler is provided.

A filler in the meaning of the present invention may be added to materials, such as paper, polymers, rubber, paints or adhesives, e.g. to lower the consumption of more expensive materials or to improve material or mechanical properties of the resulting products. The person skilled in the art very well knows the typical fillers used in the respective field.

The filler provided in step (a) may be any material which is known in the art and which is suitable to be used as a filler in the present invention.

According to one embodiment of the inventive process, the filler provided in step (a) is selected from the group consisting of a calcium carbonate containing mineral, chalk, limestone, marble, dolomite, barium sulfate, talc, kaolin, clay, mica, titan dioxide, hydrotalcite, montmorillonite, bentonite, beidelite, glimmer, hectorite, saponite, nontronite, sauconite, vermiculite, ledikite, megadite, kenyaite, stevensite, volkonskoite, feldspar kaolinite, magnesite, muscovite, huntit, or mixtures thereof.

According to a preferred embodiment of the inventive process, the filler provided in step (a) is selected from the group consisting of a calcium carbonate containing mineral, chalk, limestone, marble, dolomite, barium sulfate, talc, kaolin, clay, mica, titan dioxide or mixtures thereof.

According to another embodiment of the inventive process, the filler provided in step (a) may be a mineral filler, e.g. a solid material of a biogenic origin with an ordered atomic structure.

According to a preferred embodiment of the present invention the filler provided in step (a) is a calcium carbonate containing mineral filler.

According to a particularly preferred embodiment of the inventive process, the filler provided in step (a) is a ground calcium carbonate (GCC), a precipitated calcium carbonate (PCC), a modified calcium carbonate (MCC), or a mixture thereof.

Ground calcium carbonate (GCC) in the meaning of the present invention is a calcium carbonate obtained from natural sources which may be processed by, for example, grinding, screening and/or fractionizing by wet and/or dry, for example by a cyclone or classifier. Preferably, the natural calcium carbonate source is selected from the group consisting of chalk, limestone, marble, dolomite, or mixtures thereof.

Natural or ground calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable.

The term GCC likewise comprises GCC having a particle size in the nanometer range which is also referred to as ultrafine GCC or nano-GCC.

Precipitated calcium carbonate (PCC) in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate for example, in an aqueous environment.

Precipitated calcium carbonate (PCC) synthesis most commonly occurs by a synthetic precipitation reaction that includes a step of contacting carbon dioxide with a solution of calcium hydroxide, the latter being most often provided in form of an aqueous suspension of calcium oxide, also known as burnt lime, and the suspension of which is commonly known as milk of lime. Depending on the reaction conditions, this PCC can appear in various forms, including both stable and unstable polymorphs. Indeed, PCC often represents a thermodynamically unstable calcium carbonate material. When referred to in the context of the present invention, PCC shall be understood to mean synthetic calcium carbonate products preferably obtained by carbonation of a slurry of calcium hydroxide, commonly referred to in the art as a slurry of lime or milk of lime when derived from finely divided calcium oxide particles in water. Preferred synthetic calcium carbonate is precipitated calcium carbonate comprising aragonitic, vateritic or calcitic mineralogical crystal forms or mixtures thereof.

The term PCC likewise comprises PCC having a particle size in the nanometer range which is also referred to as ultrafine PCC or nano-PCC.

The precipitated calcium carbonate (PCC) may be comminuted prior to incorporation into the polymer material by any method known in the art. Preferably, the precipitated calcium carbonate (PCC) may be ground prior to incorporation into the polymer material, e.g. by dry and/or wet grinding.

Modified calcium carbonate (MCC) in the meaning of the present invention may feature a natural ground or precipitated calcium carbonate with an internal structure modification or a surface-reaction product, i.e. surface-reacted calcium carbonate.

The filler according to the present invention may have a weight median particle size $d_{50}$ in the range from 0.001 μm to 100 μm.

According to a preferred embodiment of the inventive process, the filler provided in step (a) has a weight median particle size $d_{50}$ in the range from 0.001 to 50 m and preferably from 0.005 to 20 μm.

According to another preferred embodiment of the inventive process, the filler provided in step (a) has a weight median particle size $d_{50}$ in the range from 0.01 to 10 μm, preferably from 0.07 to 5 μm and more preferably from 0.1 to 2.5 μm.

It was found that also nano-PCC may be used as a filler in the inventive process even at relatively high filler loads without being faced with problems typically occurring upon incorporation of high amounts of such nano-fillers and without being faced with relatively poor mechanical properties of the polymer composition obtainable in prior art processes.

In general, if nano-PCC is used as filler provided in step (a) this refers to PCC having a weight median particle size $d_{50}$ in the range from about 0.001 to about 0.07 µm, whereas ultrafine PCC refers to PCC having a weight median particle size $d_{50}$ in the range from about 0.07 to about 1 µm. According to a preferred embodiment, the filler provided in step (a) of the inventive process is a nano-PCC, preferably having a weight median particle size $d_{50}$ in the range from 0.001 to 0.07 µm, more preferably from 0.002 to 0.06 µm and most preferably in the range from 0.005 to 0.05 µm.

The filler according to the present invention may have a particle top cut $d_{98}$ in the range from 0.5 µm to 200 µm.

According to a preferred embodiment of the inventive process, the filler provided in step (a) has a particle top cut $d_{98}$ in the range from 0.25 to 50 µm, preferably from 0.35 to 30 µm and more preferably from 0.4 to 15 µm.

According to another embodiment of the inventive process, the filler provided in step (a) comprises a surface-treated or coated filler, an uncoated filler, or a mixture of both. In certain embodiments of the present invention, the filler is a surface-treated or coated mineral filler. For example, if the mineral filler is a calcium carbonate containing mineral filler, this may refer to a ground (GCC), precipitated (PCC) or modified calcium carbonate (MCC) comprising any surface treatment or coating known in the art, e.g. with one or more fatty acid, surfactant, siloxane, polymer, or a mixture thereof. The calcium carbonate containing mineral filler may thus be surface-treated or coated with an anion capable of forming water-insoluble calcium salts, wherein the anion may comprise one or more of the following: phosphate-comprising anions such as $PO_4^{3-}$ and $HPO_4^{2-}$, oxalate anions $(C_2O_4^{2-})$, carbonate-comprising anions in the form of $CO_3^{2-}$, phosphonate anions, succinate anions, or fluoride anions. The surface-treatment or coating of the calcium carbonate containing mineral filler may further comprise the steps of contacting the surface of the calcium carbonate containing filler with a mono-substituted succinic anhydride and, optionally, with a mono-substituted succinic acid such that a treatment layer is formed, comprising the mono-substituted succinic anhydride and, optionally, mono-substituted succinic acid and/or salty reaction product(s) thereof.

According to a preferred embodiment of the inventive process, the filler provided in step (a) comprises an uncoated filler and more preferably comprises an uncoated calcium carbonate containing mineral filler.

According to yet another preferred embodiment of the inventive process, the filler provided in step (a) comprises an uncoated ground calcium carbonate (GCC), an uncoated precipitated calcium carbonate (PCC), an uncoated modified calcium carbonate (MCC), or mixtures thereof.

According to still another preferred embodiment of the inventive process, the filler provided in step (a) is a ground calcium carbonate (GCC), a precipitated calcium carbonate (PCC), a modified calcium carbonate (MCC), or a mixture thereof.

According to still another preferred embodiment of the inventive process, the filler provided in step (a) is an uncoated ground calcium carbonate (GCC), an uncoated precipitated calcium carbonate (PCC), an uncoated modified calcium carbonate (MCC), or a mixture thereof.

The filler provided in step (a) of the present invention optionally may comprise one or more additives which are well known to the skilled person.

Characterization of Step (b):

According to step (b) of the inventive process for the continuous production of a polymer composition, a polymer material is provided.

A polymer material as used in this application comprises homopolymers, copolymers, such as, for example, block, graft, random and alternating copolymers, heterophasic copolymers and random heterophasic copolymers as well as polymer blends, modifications, or mixtures thereof. The term polymer material as used herein may likewise comprise recycled polymer materials. The content of recycled polymers in the polymer material may be in the range from 0.01 to 100 wt.-%.

The polymer material provided in step (b) may be a neat or virgin polymer material or may already comprise a filler which is selected from the embodiments as defined above for step (a) before the formation of the polymer composition. However, any other suitable filler material may be used.

According to one embodiment, the mineral filler material present in the polymer material provided in step (b) is identical to the mineral filler mineral material provided in step (a).

According to another embodiment, the filler present in the polymer material provided in step (b) is different from the mineral filler material provided in step (a).

The polymer material provided in step (b) of the present invention optionally may comprise one or more additives which are well known to the skilled person.

Such additives comprise, without being limited to, UV-absorbers, light stabilizers, processing stabilizers, antioxidants, heat stabilizers, nucleating agents, metal deactivators, impact modifiers, plasticizers, lubricants, rheology modifiers, processing aids, pigments, dyes, optical brighteners, antimicrobials, antistatic agents, slip agents, anti block agents, coupling agents, dispersants, compatibilizers, oxygen scavengers, acid scavengers, markers, antifogging agents, surface modifiers, flame retardants, blowing agents, smoke suppressors, reinforcement agents, such as glass fibers, carbon fibers and/or glass bubbles, or mixtures of the foregoing additives.

Preferably, the additives are selected from the class of acid scavengers based on salts of long chain carboxylic acids, such as calcium stearate, magnesium stearate, zinc stearate, and calcium lactate, or may be hydrotalcite, from the class of stabilizers based on phenolic antioxidants, benzofuranones, hydroxylamines, nitrones, thiosynergists, and phosphites/phosphonites, from the class of light stabilizers based on hindered amines (HALS), from the class of metal deactivators, from the class of dispersing agents, coupling agents, or compatibilizers, or a mixture of any of the foregoing additives.

Suitable phenolic antioxidants are, for example: Octadecyl-3-(3,5-di-tert-butyl-4-hydroxyphenyl)propanonate, pentaerythritol-tetrakis[3-(3,5-di-tert-butyl-4-hydro-xyphenyl) propanoate, tris(3,5-di-tert-butyl-4-hydroxyphenyl) isocyanurate, 1,3,5-trimethyl-2,4,6-tris(3,5-di-tert-butyl-4-hydroxybenzyl)benzene, triethyleneglycol-bis[3-(3-tert-butyl-4-hydroxy-5-methylphenyl)propanoate, N,N'-hexane-1,6-diyl-bis[3-(3,5-di-tert-butyl-4-hydroxyphenyl) propanamide.

Suitable phosphites/phosphonites are, for example: Tris-(2,4-di-tert-butylphenyl)-phosphite, 3,9-bis(2,4-di-tert-butylphenoxy)-2,4,8,10-tetraoxa-3,9-diphospha-spiro[5.5]undecene, tetrakis(2,4-di-tert-butylphenyl)[1,1-biphenyl]-4,4'-diylbisphosphonite.

Suitable sterically hindered amines are, for example: 1,1-Bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-n-butyl-3,5-di-tert-butyl-4-hydroxybenzylmalonate, the condensation product of 1-(2-hydroxyethyl)-2,2,6,6-tetramethyl-4-hydroxypiperidin and succinic acid, linear or cyclic condensation products of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinon), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylenediamine and 4-morpholino-2,6-dichloro-1,3,5-triazine, the reaction product of 7,7,9,9-tetramethyl-2-cycloundecyl-1-oxa-3,8-diaza-4-oxospiro[4.5]decene and epichlorohydrine.

Suitable dispersants are, for example: Polyacrylates, such as copolymers with long side chains, and polyacrylate block copolymers; alkylamides, such as N,N'-1,2-ethanediylbisoctadecaneamide; sorbitan esters, such as monostearylsorbitan ester; titanates und zirconates; reactive copolymers, such as polypropylene-acrylic acid copolymer; polypropylene-maleic anhydride copolymer, polyethylene-glycidylmethacrylate copolymer; polystyrol-maleic anhydride-polysiloxane alternating copolymer, such as dimethylsilanediol-ethyleneoxide copolymer; polyphenylsiloxan copolymer, amphiphilic copolymers, such as polyethylene-polyethyleneoxide block copolymer; and dendrimers, such as hydroxy containing dendrimers.

A suitable metal deactivator may be, for example, N,N'-bis(3,5-di-tert-butyl-4-hydroxyphenylpropionyl)hydrazine. According to another embodiment, the metal deactivator may be selected from one or more of the following structures:

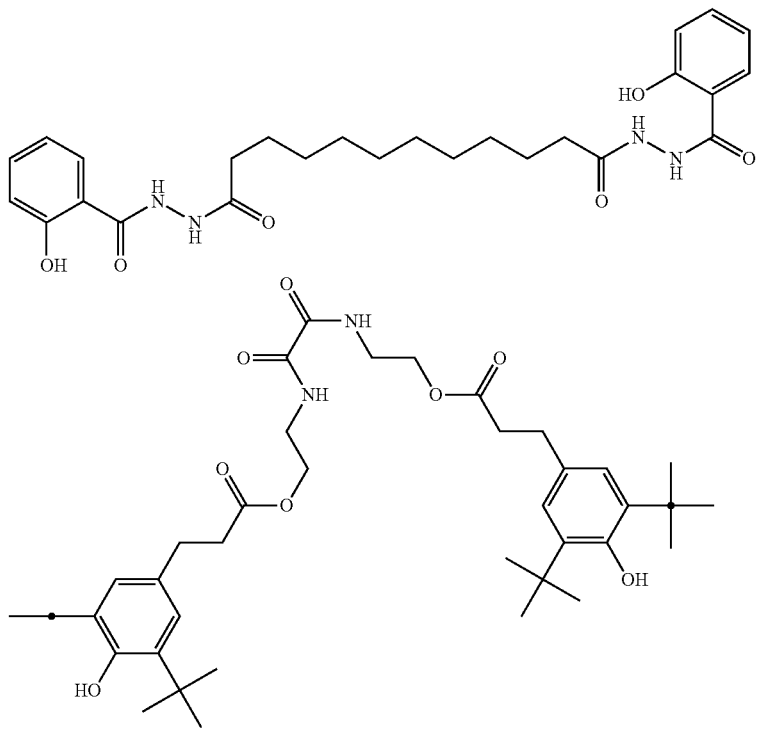

According to one embodiment of the inventive process, the polymer material provided in step (b) comprises a thermoplastic resin, wherein the thermoplastic resin preferably comprises a polyolefin.

Such thermoplastic resins suitable for the present invention may comprise without being limited to:

a) Polymers from olefins and diolefins, for example, polyethylenes (LDPE, LLDPE, VLDPE, ULDPE, MDPE, HDPE, UHMWPE), polypropylene, polyisobutylene, poly-4-methyl-pentene-1, polybutadiene, polyisoprene, polycyclooctene, as well random or block copolymers, such as ethylene/but-1-ene copolymers, ethylene-hexene copolymers, ethylene-methylpentene copolymers, ethylene-octene copolymers, polypropylene-polyethylene (EP), EPM, EPDM, ethylene-vinylacetat (EVA), and ethylene-acrylic ester copolymers b) Polystyrene, polymethylstyrene, styrene-butadiene copolymers (SB), styrene-butadiene-styrene (SBS) and its hydrogenated polymer (SEBS), Styrene-isoprene, styrene-isoprene-styrene (SIS), styrene-butadiene-acrylnitrile (ABS), styrene-acrylnitrile-acrylate (ASA), styrene-maleic anhydride, and grafted polymers, for example, styrene-grafted butadiene, maleic acid anhydride-grafted SBS, or grafted polymers from methylmethacrylate, styrene-butadiene and ABS (MABS)

c) Halogen containing polymers such as polyvinylchloride, polychloroprene, polyvinylidenchloride, chlorinated polyethylene, or polytetrafluoroethylene,
d) Polymers from unsaturated esters such as polyacrylates, or polymethacrylates, for example, polymethylmethacrylate, polyacrylonitrile, polyacrylamide, polybutylacrylate,
e) Polymers derived from unsaturated alcohols such as polyvinylalcohol, polyvinylacetate, or polyvinylbutyral (PVB)
f) Polyacetales, for example, polyoxymethylene and copolymers thereof
g) Polyphenyleneoxide as well as polystyrene or polyamide blends thereof
h) Polyurethanes (PU), in particular linear polyurethanes (TPU)
i) Polyamides (PA), such as PA-6, PA-6.6, PA-6.10, PA-4.6, PA-4.10, PA-6.12, PA-12.12, PA-11, PA-12 as well as partially aromatic polyamides (e.g. polyphthalamides)
j) Polyimides, polyamidimides, polyetherimides, polyketones, polysulfones, polyethersulfones, and polyphenylensulfides
k) Polyethyleneterephthalate (PET), polybutyleneterephthalate (PBT), polypropyleneterephthalate, polyethylenenaphthylate,
l) Polycarbonates,
m) Cellulose derivatives, such as cellulose nitrate, cellulose acetate, or cellulose propionate
n) Partially or fully bio-based polymers derived from renewable biomass sources, such as vegetable fats and oils, corn starch, pea starch, or microbiota, aliphatic biopolyesters, such as polyhydroxyalkanoates (PHA), polyhydroxybutyrate (PHB), polyhydroxyvalerate (PHV), polyhydroxyhexanoate (PHH), or polyesters such as polylactic acid (PLA),
o) Blends, mixtures, alloys and combinations comprising at least one of the above polymers According to one embodiment, the polyolefin is selected from the group of homo- and/or copolymers of polyethylene, homo- and/or copolymers of polypropylene, homo- and/or copolymers of polybutylene, or mixtures thereof.

According to another embodiment of the inventive process, the polyolefin comprises a polyethylene, a polypropylene, a polybutylene, or mixtures thereof.

According to another preferred embodiment of the inventive process, the polymer material provided in step (c) is selected from the group consisting of polyethylenes, polypropylenes, polybutylenes, or mixtures thereof, wherein the polymer material preferably is a polyethylene.

According to a particularly preferred embodiment, the polymer provided in step (b) comprises a low density polyethylene (LDPE) and/or a linear low density polyethylene (LLDPE).

According to another particularly preferred embodiment, the polymer provided in step (b) is a low density polyethylene (LDPE) and/or a linear low density polyethylene (LLDPE). According to yet another particularly preferred embodiment the polymer provided in step (b) is LDPE having a density ranging from 0.910 to 0.940 g/cm$^3$, LLDPE having a density ranging from 0.915 to 0.925 g/cm$^3$, VLDPE having a density ranging from 0.880 to 0.915 g/cm$^3$, or a mixture thereof.

Characterization of Step (c):

According to step (c) of the inventive process, a polymer composition is formed by use of an extruder, wherein said polymer composition comprises the filler provided in step (a) and the polymer material provided in step (b).

The extruder according to step (c) of the present invention may be any extruder known to the skilled person.

According to one embodiment, the extruder is a screw extruder, wherein the screw extruder preferably is a single-screw extruder, a twin-screw extruder, or a multi-screw extruder.

According to a preferred embodiment, the extruder is a twin-screw extruder, wherein the screws preferably are co-rotating or counter-rotating screws and more preferably are co-rotating screws.

Such (twin screw) extruders are typically designed as a modular system. The extrusion process thus can be divided into a series of individual steps which are reflected by different processing zones of the extruder. These zones may comprise, for example, a feeding zone, a melting/plastification zone, a feeding zone for fillers, a side feeding zone in general, a dispersion zone, a homogenization zone, a degassing zone with, e.g. one or more atmospheric or vacuum vents, and a discharging zone.

Unless indicated otherwise, the term "injection zone" as used herein refers to any zone within an extruder in which the polymer material is present in least partially molten state or in a completely molten state. In particular, the term "injection zone" encompasses a melting/plastification zone, a feeding zone for fillers, a side feeding zone in general, a dispersion zone, and a homogenization zone.

Typically, the processing zones of such a (twin screw) extruder, the overall arrangement of which is also referred to as "screw cylinder", may consist of different barrels which may be used to install the processing zones in a modular fashion. These barrels may have a specific design in order to fulfil well-defined processing demands:

Feeding barrels: The feeding barrel has an opening at the upper side in order to feed solid components (such as polymer materials, powders or additives) into the extruder. The feeding opening can be placed upstream or downstream of the barrel, or it may be placed in the center of the barrel.

Closed and normal barrels

Barrels with screw opening at the upper side: These barrels have a screw opening which allows for attaching pressure or temperature sensors. With such sensors processing parameters of the polymer melt, such as pressure or temperature can be monitored during processing. Such screw openings can be also used to attach a nozzle in order to inject liquids or slurries into the extruder.

Barrels with opening for a side feeder: Such barrels have normally one opening at one side allowing for the attachment of a side feeding device. In addition, this barrel may have a degassing opening at the top side. Such openings can be used for degassing of air, which may have been introduced into the process while feeding, e.g. powder or fibres through the side feeder. Alternatively or additionally, such side feeders and side feeding barrels can be also used for a degassing step without using same for side feeding. In this respect, the term degassing may refer to the removal of any substance in gaseous state.

Barrels with degassing opening at the upper side: These barrels are used for the removal air, moisture or water in general, volatile glazes, or any other material which is in gaseous state. It is obvious to the skilled person that different designs of such a degassing zone may be used. This degassing step can thus be carried out by using an atmospheric vent or a vacuum vent. For vacuum degassing, a separate vacuum pump needs to be plugged to the vacuum vent.

Discharging barrels: These barrels have an opening which allows for discharging the primary polymer product from the extruder and feeding said primary product to a subsequent processing step. For example, said subsequent step may comprise further processing by use of a standard granulating line or by use of an underwater granulating device.

The screw configuration may comprise different screw elements and can be classified in to different types:

Conveying elements: Such elements have the function of conveying the solid or at least partially molten polymer material from processing zone to another and finally serve to convey the primary product from the discharging zone. According to the conveying rate or pressure built-up, those elements have different shapes and drifts. There are also some back conveying elements in order to increase the residence time in a certain processing zone.

Mixing elements: Such elements are used for melting the polymer material as well as for distributive and dispersive mixing of the polymer material with any further material, such as fillers or additives. The skilled person knows that there exist many different mixing elements available today. For example, block kneading elements and tooth mixing elements may be used for this purpose.

A typical characteristic of an extrusion process is the L/D ratio. The L/D ratio describes the ratio between the screw length and the screw diameter. The L/D ratio typically ranges from 40 to 50 and preferably from 42 to 46. However, in some cases this value may be lower, for example in the range from 35 to 40 whereas in other cases even high values ranging from 50 to 60 may be required.

According to step (c) of the present invention, the filler is incorporated into the polymer material, wherein said polymer material during incorporation of said filler is in least partially molten state.

In certain embodiments of the inventive process, the filler is incorporated into the polymer material, wherein said polymer material during incorporation of said filler is in completely molten state.

According to a preferred embodiment of the present invention, said filler may be injected directly into the injection zone of the extruder.

The inventive process is characterized in that it comprises the incorporation of said filler into said polymer material, wherein the polymer material during incorporation of the filler is in at least partially molten state and wherein said filler is incorporated as a slurry.

For the purpose of the present invention, the term slurry refers to any suspension comprising said filler and at least one liquid, wherein the filler is at least partially insoluble in said at least one liquid. Slurries usually contain large amounts of solids and are more viscous and generally of higher density than the liquid from which they are formed.

According to one embodiment of the present invention, the at least one liquid of the slurry is removed during the process. Such liquids may comprise, without being limited to, for example, protic solvents (e.g. water, alcohols, and the like) or aprotic solvents (e.g. ethers, ketones, esters, lactones and the like), or any suitable mixture thereof.

According to a preferred embodiment of the inventive process, the slurry is an aqueous slurry, i.e. the at least one liquid which may be removed during the process is water, e.g. tap water or deionized water.

The slurry according to the present invention may further comprise any additive which is known in the art or which may improve the characteristics of said slurry. For example, a dispersing agent and/or any other additive suitable to reduce the viscosity of said slurry may be present.

According to one embodiment, the filler slurry has a solids content in the range from 10 to 90 wt.-%, preferably from 15 to 88.5 wt.-% and more preferably from 20 to 78 wt.-%, based on the total weight of said filler slurry.

According to another embodiment of the present invention, the filler slurry has a solids content in the range from 15 to 85 wt.-%, preferably from 20 to 80 wt.-% and more preferably from 25 to 75 wt.-%, based on the total weight of said filler slurry.

In certain embodiments of the present invention, the filler slurry has a viscosity which allows for a particularly homogenous incorporation of said filler into the polymer material.

For the purpose of the present invention, the term viscosity refers to the dynamic viscosity also known as the shear viscosity. The dynamic viscosity is defined as the tangential force per unit area required to move one horizontal plane with respect to the other at unit velocity when maintained a unit distance apart the fluid. According to this definition, a fluid with a viscosity of 1 Pa·s that is placed between two plates, and wherein one plate is pushed sideways with a shear stress of 1 Pa will result in moving a distance equal to the thickness of the layer between the plates in one second (The Rheology Handbook, Thomas G. Mezger, Vincentz Verlag 2002, page 21). The dynamic viscosity may be measured with a coaxial cylinder measuring system, for example, with a Physica MCR 300 rheometer from Paar Physica equipped with a measuring temperature control cell TEZ 150 P-C and a coaxial cylinder CC 27 measuring system at a constant rotational speed of 100 l/min.

The Brookfield viscosity is defined as the viscosity measured by a Brookfield viscosimeter at 20° C.±2° C. at 100 rpm and is specified in mPa·s.

According to one embodiment of the present invention, the filler slurry injected into the injection zone of an extruder has a Brookfield viscosity measured at 20° C. in the range from 20 to 2000 mPa·s, more preferably from 100 to 1500 mPa·s and most preferably from 200 to 1000 mPa·s.

The inventive process is characterized in that it comprises the incorporation of said filler into said polymer material, wherein the polymer material during incorporation of the filler is in an at least partially molten state and wherein said filler is incorporated as a slurry which may be injected directly into the injection zone of an extruder.

In a particularly preferred embodiment, the inventive process comprises the incorporation of said filler into said polymer material, wherein the polymer material during incorporation of the filler is in completely molten state and wherein said filler is incorporated as a slurry which is injected directly into the injection zone of an extruder.

According to another particularly preferred embodiment of the present invention, a process for the continuous production of a polymer composition by use of an extruder is provided, said polymer composition comprising the filler provided in step (a) and the polymer material provided in step (b), characterized in that the polymer material during incorporation of the filler is in completely molten state, wherein said filler is incorporated as a slurry, the filler slurry comprising said filler and at least one liquid and wherein said filler slurry may be injected directly into the injection zone of the extruder.

According to yet another particularly preferred embodiment of the present invention, a process for the continuous production of a polymer composition by use of an extruder is provided, said polymer composition comprising the filler provided in step (a), said filler provided in step (a) being a calcium carbonate containing mineral filler, and a polymer material provided in step (b), said polymer material provided in step (b) being a polyolefin, characterized in that the polymer material during incorporation of the filler is in completely molten state, wherein said filler is incorporated as a slurry, the filler slurry comprising said filler and water, and wherein said filler slurry may be injected directly into the injection zone of the extruder.

In certain embodiments of the present invention, the filler slurry may be injected in one or more (e.g., two or three) different positions of the injection zone. The one or more different positions may be arranged along and/or crosswise to the production flow.

According to a preferred embodiment, the one or more atmospheric or evacuated vents are located downstream from the point(s) of injection of the filler slurry.

According to one embodiment of the present invention, the pressure within said injection zone of the extruder is as high as to prevent the at least one liquid of the filler slurry from immediately evaporating after injection in order to allow sufficient mixing of the polymer with said filler slurry. Suitably, the pressure within the injection zone of the extruder is above the vapour pressure of the at least one liquid at the processing temperature of the extruder, wherein the corresponding atmospheric vents or vacuum vents for evaporation of the at least one liquid of the filler slurry may be preferably located downstream from the one or more points of injection of the filler slurry.

Preferably, the filler slurry is injected directly into the injection zone of an extruder by use of nozzle, wherein the injection pressure is as high as to prevent evaporation of the at least one liquid in said injection nozzle. Suitably, the injection pressure in the nozzle is above the vapour pressure of the at least one liquid at the processing temperature of the extruder.

For example, if the at least one liquid of the filler slurry is water, the pressure within the injection zone of the extruder and the injection pressure in the nozzle is above the vapour pressure of water at the processing temperature of the extruder. For this purpose, any pump can be used which provides a sufficiently high pressure and throughput of the filler slurry. Suitably, a membrane pump, a piston pump with one or more chambers, a gear pump, a radial flow pump, or a hose pump is used.

According to another embodiment of the present invention, the pressure within the injection zone of the extruder and the injection pressure in the nozzle is in the range from 1 to 50 bar, more preferably from 5 to 40 bar and most preferably from 10 to 30 bar. According to yet another embodiment of the present invention, the pressure within the injection zone is equal or less than 200 bar, preferably equal or less than 150 bar and most preferably equal or less than 100 bar. Suitably, the pressure within the injection zone of the extruder is below the injection pressure in the nozzle.

According to yet another embodiment, the inventive process comprises the incorporation of a filler into a polymer material, wherein the polymer material during incorporation of said filler is in at least partially molten or completely molten state and wherein the temperature of said polymer material which is in at least partially molten or completely molten state.

In general, the incorporation of a filler into an at least partially molten polymer material is performed at temperatures which are from 50 to 150° C. above the glass transition temperature if an amorphous polymer is used. In other cases, temperatures are from 10 to 50° C. above the melting point if the polymer material is an at least partially crystalline polymer.

According to a preferred embodiment of the present invention, the polymer material provided in step (b) is an at least partially crystalline polymer material, such as polyethylene, polypropylene, polybutylene, or a mixture thereof, wherein the at least partially crystalline polymer material during incorporation of said filler is in at least partially molten or completely molten state and wherein the temperature of said polymer material which is in at least partially molten or completely molten state is in the range from 120° C. to 280° C. and preferably in the range from 150 to 250° C.

According to yet another embodiment, the inventive process comprises the incorporation of a filler into a polymer material, wherein the polymer material during incorporation of said filler is in at least partially molten or completely molten state and wherein the temperature of said polymer material which is in at least partially molten or completely molten state is in the range from 20 to 250° C., preferably from 30 to 200° C., more preferably from 40 to 150° C. and most preferably from 50 to 130° C.

In certain preferred embodiments of the present invention, the temperature of said polymer material which is in at least partially molten or completely molten state is in the range from 50 to 300° C., preferably from 100 to 250° C. and more preferably from 150 to 200° C.

The at least one liquid of the slurry may be removed during step (c) of the inventive process. Preferably, the at least one liquid of the filler slurry is allowed to vaporize after direct injection of the filler slurry into the injection zone of an extruder and after sufficient mixing.

In a preferred embodiment, the at least one liquid of the filler slurry is allowed to vaporize through one or more (e.g., two or three) atmospheric or vacuum vents. However, a small percentage of the at least one liquid may remain in the polymer composition obtainable by the inventive process. In addition or alternatively to the one or more atmospheric or vacuum vents, a feeding device may be used to vaporize the at least one liquid of the filler slurry after injection into the injection zone of an extruder.

According to step (c) of the inventive process, a polymer composition is formed by use of an extruder, wherein said polymer composition comprises the filler provided in step (a) and the polymer material provided in step (b). If necessary, any additive known to the skilled person may be already present in the filler provided in step (a) and/or in the polymer material provided in step (b).

However, further additives known in the art may be added in step (c). Such additives may be added at any time during step (c) and in any part of the extruder. Without being limited to, said additives may be selected, for example, from one or more of any of the additives specified in the detailed descriptions of steps (a) and (b).

The inventive process for the continuous production of a polymer composition has several advantages:

According to the present invention, a process for the production of a polymer composition is provided which may be operated in a continuous manner.

The inventive process is characterized in that it comprises the incorporation of said filler into said polymer material, wherein the polymer material during incorporation of the filler is in at least partially molten state and wherein said filler is incorporated as a slurry which may be injected directly into the injection zone of an extruder. The filler slurry comprises said filler and at least one liquid which may be removed during step (c) of the process. Preferably, the at least one liquid of the filler slurry is allowed to vaporize after direct injection of the filler slurry into the injection zone of an extruder and after sufficient mixing. The process for the continuous production of a polymer composition according to the present invention therefore does not require any additional and costly heating step in order to remove the at least one liquid of the filler slurry after being injected.

The filler according to the inventive process is incorporated as a slurry which may be injected directly into the injection zone of an extruder allowing for a more precise and uniform dosage of the filler. For this purpose, for example, a double piston membrane pump may be used for injection of the filler slurry into said injection zone of the extruder.

The Polymer Composition:

According to the present invention, a process for the continuous production of a polymer composition by use of an extruder is provided, said polymer composition comprising the filler of step (a) and the polymer material of step (b).

According to step (c) of the inventive process, the at least one liquid of the slurry may be removed during step (c) of the inventive process. However, a small percentage of the at least one liquid may remain in the polymer composition obtainable by the inventive process.

According to one embodiment, the at least one liquid may be present in the polymer composition in an amount which is equal to or less than 5 wt.-%, preferably equal to or less than 1 wt.-%, more preferably equal to or less than 0.5 wt.-% and most preferably equal to or less than 0.2 wt.-%, based on the total weight of said polymer composition.

If water is used as the at least one liquid, the polymer composition obtainable by the inventive process has a total water content which is equal to or less than 2 wt.-%, preferably equal to or less than 1 wt.-% and more preferably equal to or less than 0.5 wt.-%, based on the total weight of said polymer composition.

As described above, the at least one liquid of the filler slurry may be water which may be removed during step (c). However, a small percentage of water may remain in the polymer composition which is also referred to as total water content or total residual moisture. The total water content or total residual moisture of the polymer composition according to the inventive process is thus comprised from residues of the at least one liquid of the filler slurry on the one hand and residual water already present in the polymer material provided in step (b) on the other hand, both of which have not been removed completely during step (c).

Optionally, the moisture content of the polymer composition may be further reduced by any method known in the art. For this purpose, for example, a hot-air dryer may be used.

The total water content or total residual moisture of the polymer composition according to the present invention is determined by use of an AquatracPLUS equipment (Brabender Messtechnik GmbH & Co. KG, Duisburg, Germany).

In certain embodiments of the present invention, the at least one liquid (e.g. water) of the filler slurry is completely removed during step (c) of the inventive process.

The filler in the polymer composition according to the present invention may be present in a wide range. Accordingly, the polymer composition obtainable by the inventive process may be a polymer compound or a polymer masterbatch. According to one embodiment, the polymer composition is a polymer compound. According to another embodiment of the present invention, the polymer composition is a polymer masterbatch.

Independently from the fact that the polymer composition may be used as a compound or as a masterbatch, the filler content of the polymer composition may be in the range from 0.5 to 90 wt.-%, preferably from 5 to 85 wt.-%, more preferably from 10 to 80 wt.-% and most preferably from 20 to 75 wt.-%, based on the total weight of said polymer composition.

According to one embodiment of the present invention, the filler content of the polymer composition may thus be in the range from 0.5 to 45 wt.-%, preferably from 1 to 42 wt.-%, more preferably from 2 to 40 wt.-% and most preferably from 5 to 35 wt.-%, based on the total weight of said polymer composition. Polymer compositions having such lower filler content are herein referred to as "polymer compounds" and preferably are used for directly manufacturing the final product. If necessary, the filler content may be further lowered by compounding with additional polymeric material(s) prior to processing into the final product.

According to another embodiment of the present invention, the filler content of the polymer composition may be in the range from 35 to 90 wt.-%, preferably from more than 42 to 90 wt.-%, more preferably from 65 to 90 wt.-% and most preferably from 70 to 85 wt.-%, based on the total weight of said polymer composition. Polymer compositions having such high filler content are herein referred to as "polymer masterbatch" and preferably are used accordingly, i.e. the filler content of the masterbatch is further lowered by compounding with additional polymeric material(s) prior to processing into the final product. However, the polymer masterbatch according to the present invention may also be used for directly manufacturing the final product.

By means of the inventive process, a polymer composition is provided. Said polymer composition may be obtained as a material having a defined shape, such as pellets, spheres, pearls, beads, prills, flakes, chips or slugs, or a non-defined shape, such as, for example, crumbles. Alternatively, the polymer composition may be a mixture of both defined and non-defined shape materials.

The inventors surprisingly found that the use of the polymer composition obtainable by the inventive process provides several advantages:

For example, the process for the continuous production of a polymer composition according to the present invention allows for the provision of a more homogenous material.

Moreover, the inventive process for the continuous production of a polymer composition leads to a decreased filter pressure value of the resulting polymer melt during production attesting a higher degree of dispersion as compared to conventional methods.

The use of a polymer composition according to the present invention in the manufacture of polymer products further results in improved material or mechanical properties of said polymer products, such as granulates, pipes, technical profiles, wall panels, ceiling panels, cladding panels, wire or cable insulations, films (e.g. blown films), sheets, fibres, or non-wovens. Such improved material or mechanical properties of said polymer products refer, for example, to the ash content, yield stress, yield elongation, stress at break, force at break, elongation at break, tensile modulus, tear propagation resistance, as well as dart drop fall weights.

According to another embodiment of the present invention, a polymer product comprising the polymer composition obtainable by the inventive process is provided.

According to another embodiment, the polymer composition obtainable according to the inventive process may be used in the manufacture polymer products.

However, the polymer composition according to the present invention is not restricted to be used in admixture with another polymer material. In certain embodiments of the present invention, the polymer composition (e.g. in form of granulate or the like) may thus be used directly in the manufacture of polymer products, i.e. no additional polymer material is used or admixed.

According to a preferred embodiment, the polymer composition of the present invention may be used in the manufacture of polymer products, wherein the polymer composition is added to at least another polymer material, for example, prior to extrusion.

According to yet another embodiment, the polymer composition obtainable by the inventive process may be used in the manufacture of polymer products, wherein said polymer products preferably comprise polyolefin articles, such as woven fibers, non-woven fibers, profiles, cables, films, or molded products.

The products comprising the polymer composition according to the present invention may be manufactured by any process known to the skilled person.

In the art, many methods for the manufacture of polymer products are known. These methods include, without being limited to, melt processing techniques, for example, profile extrusion (for pipes, sheets and hollow sheets), cable extrusion, film extrusion (for cast films and blown films), molding (e.g., injection molding, rotomolding, blow molding and thermoforming), fiber spinning (e.g., melt spinning, wet spinning, dry spinning and structural fibers), co-kneading and pultrusion. The final articles may provide mono-layer or multi-layer structures.

According to one embodiment of the present invention, the polymer composition obtainable by the inventive process can advantageously be used for the preparation of various shaped articles for plastics applications. Examples include flexible packaging for industrial and consumer applications, including roll stocks, bags, pouches, labels, wraps, liddings, shrink sleeves and stretch films; rigid packaging for industrial and consumer applications including plastic bottles, cups and containers; building and construction materials, including pipes and conduits, cladding and profiles, insulations, seals and gaskets, geotextiles; agriculture and horticulture materials including greenhouse materials, mulch films, tunnel, silage, bale wraps, boxes and crates; transportation and automotive applications including interior parts, such as instrument and door panels, consoles, pillars and seating; exterior parts, such as bumper fascia, fenders, tailgates as well as under the hood applications including air ducts, air intake manifolds, radiators and cooling hoses; electrical and electronic applications including CD players, DVD systems, personal computers and TV sets, notebooks, tablets, smartphones, cookers, refrigerators and freezers, washing machines, dishwashers, tools and office equipment; medical and health applications including disposable caps, gowns, masks, scrub suits and shoe covers, drapes, wraps and packs, sponges, dressings and wipes, bed linen, contamination control gowns, examination gowns, lab coats, isolation gowns, diagnostic medical machinery and medical devices; personal care products including absorbent hygiene products (AHP), baby diapers, feminine hygiene products and adult incontinence products, wipes, skin care products, depilatory strips; household and furniture products, including wood composites, decorative foils, floor coverings, flooring, kitchen ware, cleaners, pet care, lawn and garden articles; toys, sports and leisure articles including playhouses, building kits, play vehicles, sports and fitness devices, shoes, clothing and sportswear, safety equipment (helmets, kneepads), sports equipment, and suit cases.

The scope and interest of the invention may be better understood on basis of the following examples which are intended to illustrate embodiments of the present invention. However, they are not to be construed to limit the scope of the claims in any manner whatsoever.

EXAMPLES

Measurements

Ash Content

The ash content test was performed by burning 5 to 30 g of the corresponding polymer composition at 570° C. for 120 minutes.

Filter Pressure Value (FPV)

The filter pressure test was performed on a commercially available Collin Pressure Filter Test Teach-Line FT-E20T-IS. The test method was performed in agreement with European Standard EN 13900-5 with each of the corresponding polymer compositions (16 g effective calcium carbonate per 200 g of final sample, diluent: LLDPE ExxonMobil LL 1001 VX) using a 14 µm type 30 filter (GKD Gebr. Kufferath AG, Düren, Germany), wherein no melt pump was used, the extruder speed was kept at 100 rpm, and wherein the melt temperature was 225 to 230° C. (temperature setting: 190° C./210° C./230° C./230° C./230° C.).

Extrusion Simulation

The extrusion simulation was developed to evaluate the mineral dispersion in a polymer composition. The test equipment and conditions are the same as for the filter pressure value test. Each of the corresponding polymer composition (215 g effective calcium carbonate per 400 g of final sample, diluent: LLDPE ExxonMobil LL 1001 VX) was measured using a 25 µm type 30 filter (GKD Gebr. Kufferath AG, Düren, Germany). The results are expressed in bar and can be calculated by subtracting the final melt pressure (determined after 5 min of purging with pure polymer material) from the initial pressure of the polymer composition.

Yield Stress

Yield stress determination was performed according to ISO 527-3. The film specimen width was 15 mm and the testing length of 5 cm.

Yield Elongation

Yield stress determination was performed according to ISO 527-3. The film specimen width was 15 mm and the testing length of 5 cm.

Stress at Break

Yield stress determination was performed according to ISO 527-3. The film specimen width was 15 mm and the testing length of 5 cm.

Force at Break

Yield stress determination was performed according to ISO 527-3. The film specimen width was of 15 mm and the testing length of 5 cm.

Elongation at Break

Yield stress determination was performed according to ISO 527-3. The film specimen width was of 15 mm and the testing length of 5 cm.

Tensile E-Modulus

Yield stress determination was performed according to ISO 527-3. The film specimen width was 15 mm and the testing length of 5 cm. The E-modulus corresponded to the inclination of the tensile test curve between the points at 0.02% and 2% of elongation.

Visual Evaluation of the Film

Film samples have been put under a light microscope. Calcium carbonate agglomerates appear black upon illumination from below and white upon illumination from above.

Tear Propagation Resistance

Determination was performed according to ISO 6383.

Dart Drop Test

Measurement was performed according to ASTMD 1709A.

Total Water Content of Polymer Compositions

The total water content or total residual moisture of the polymer composition according to the present invention is determined by use of a AquatracPLUS equipment (Brabender Messtechnik GmbH & Co. KG, Duisburg, Germany). The moisture (water) of the polymer composition is reacted with calcium hydride which results in a pressure increase which is proportional to the water content of the analyzed material due to the formation of gaseous hydrogen. The testing temperature was 130° C. by use of measuring cup B. The sample weight was 15 g of the corresponding polymer composition.

Materials:

Filler: Omyalite® 90-OM

Ground calcium carbonate, commercially available from Omya AG, Switzerland; particle size $d_{50}$: 1.1 μm; top cut $d_{98}$: 3.5 μm; uncoated.

Filler: Omyalite® 95T-OM

Ground calcium carbonate, commercially available from Omya AG, Switzerland; particle size $d_{50}$: 1.1 μm; top cut $d_{98}$: 3.5 μm; coated.

Filler slurry: Omyalite® 90-OM 74%

Ground calcium carbonate, commercially available from Omya AG, Switzerland; particle size $d_{50}$: 1.1 μm; top cut $d_{98}$: 3.5 μm; uncoated; solids content: 74 wt.-%.

Dowlex™ NG 5056G

Linear low density polyethylene (LLDPE), commercially available from Dow Chemical; melt flow index: 1.1 g·10 $min^{-1}$ (190° C., 2.16 kg); density: 0.919 g·$cm^{-3}$ as taken from the TDS (technical data sheet).

Example 1—Production of a Polymer Composition (Comparative Example)

LLDPE was fed into the feeding zone of an extruder (Coperion ZSK-18, Coperion GmbH, Germany) having the configuration shown in FIG. 1A.

Barrels:

| No. | Barrel type |
|---|---|
| 1 | Feed |
| 2 | Solid |
| 3 | Solid |
| 4 | Solid |
| 5 | Solid |
| 6 | Combi Barrel 18/18 |
| 7 | Solid |
| 8 | Vent Barrel |
| 9 | Vent Barrel (closed) |
| 10 | Endbarrel |

Screw Configuration:

| Amount | Type |
|---|---|
| 1 | Conveying Element 12/12 |
| 5 | Conveying Element 24/24 |
| 1 | Kneading Element KB45/5/16 N-3FE |
| 2 | Kneading Element KB45/5/16 3FE |
| 1 | Kneading Element KB45/5/16 3FE-N |
| 1 | Conveying Element 24/12 |
| 2 | Conveying Element 24/24 |
| 1 | Kneading Element KB45/5/16 |
| 1 | Kneading Element KB45/5/24 |
| 2 | Conveying Element 24/24 |
| 4 | Conveying Element 36/18 SK |
| 1 | Conveying Element 36/18 SK-N |
| 1 | Conveying Element 24/12 |
| 4 | Kneading Element KB45/5/24 |
| 1 | Kneading Element KB45/5/8-LH |
| 1 | Conveying Element 16/8 LH |
| 1 | Conveying Element 24/24 |
| 1 | Spacer/1 |
| 2 | ZME 6/11 |
| 1 | Spacer/1 |
| 1 | Conveying Element 24/12 |
| 1 | Conveying Element 24/24 |
| 2 | Conveying Element 16/16 |

Temperature Zones:

| | Barrel | | | | | | | | | |
|---|---|---|---|---|---|---|---|---|---|---|
| | 1 | 2 | 3 | 4 | 5 | 6 | 7 | 8 | 9 | 10 |
| Temperature zone | — | | 1 | 2 | 3 | | 4 | 5 | 6 | 7 |
| T [° C.] | cooled | 170 | 160 | 160 | 170 | 190 | 200 | 200 |
| Throughput | | | | 7 kg · $h^{-1}$ | | | | |
| Screw speed | | | | 600 $min^{-1}$ | | | | |

The temperature zone with indication of the corresponding temperatures in the zones indicates the temperature profile of the corresponding barrel.

The polymer was then melted in the melting/plastification zone by using triple-thread kneading elements. These elements ensure a smooth melting process during extrusion. After a short conveying section, the screw was equipped with further kneading elements of the type KB 45/5/16 and KB 45/5/24. Hereafter, a side feeder was attached to the extruder at barrel no. 6 and the uncoated calcium carbonate powder (Omyalite® 90-OM) was fed into the extruder. The injection zone was equipped with kneading elements for dispersive mixing and with left-handed elements to increase the residence time in this section ensuring a good mixing of the polymer material and filler. After a short conveying element, the screw was equipped with tooth elements to ensure a distributive mixing of the filler in the polymer matrix. After a degassing zone, the polymer was discharged into a water bath prior to granulation.

The following samples were obtained as pellets:

TABLE 1

Filler content, filter pressure values (FPV), ash content and moisture content of comparative samples 1-3.

| | Sample No. | | |
|---|---|---|---|
| | 1 | 2 | 3 |
| Filler content [wt.-%] | 10 | 30 | 60 |
| FPV [bar · $g^{-1}$] | 1.3 | 1.4 | 1.0 |
| Ash content [%] | 10.0 | 29.7 | 59.1 |
| Moisture content [ppm] | n.d. | n.d. | 958 |
| Extrusion simulation [bar] | n.d. | n.d. | >120 |

For the production of sample 3, the screw speed was reduced to 550 min⁻¹.

Example 2—Production of a Polymer Composition
(Comparative Example)

LLDPE was fed into the feeding zone of an extruder (Coperion ZSK-18, Coperion GmbH, Germany) having the configuration as described for example 1. Coated calcium carbonate powder (Omyalite® 95T-OM) was fed into the extruder by use of a side feeder of the extruder and was allowed to be mixed with the polymer melt prior to discharging and granulation.

The following samples were obtained as pellets:

TABLE 2

Filler content, filter pressure values (FPV), ash content and moisture content of comparative samples 4-6.

| | Sample No. | | |
|---|---|---|---|
| | 4 | 5 | 6 |
| Filler content [wt.-%] | 10 | 30 | 60 |
| FPV [bar · g⁻¹] | 1.0 | 0.8 | 0.9 |
| Ash content [%] | 9.6 | 29.4 | 58.5 |
| Moisture content [ppm] | n.d. | n.d. | 855 |
| Extrusion simulation [bar] | n.d. | n.d. | 30 |

For the production of sample 6, the screw speed was reduced to 550 min⁻¹.

Example 3—Production of a Polymer Composition
(Inventive)

LLDPE was fed into the feeding zone of an extruder (Coperion ZSK-18, Coperion GmbH, Germany) having the configuration shown in FIG. 1B.

Barrels:

| No. | Barrel type |
|---|---|
| 1 | Feed |
| 2 | Solid |
| 3 | Solid |
| 4 | Solid with Vent |
| 5 | Combi Barrel 18/18 Solid |
| 7 | Solid |
| 8 | Vent Barrel |
| 9 | Vent Barrel (closed) |
| 10 | Endbarrel |

Screw Configuration:

| Amount | Type |
|---|---|
| 1 | Conveying Element 12/12 |
| 4 | Conveying Element 24/24 |
| 1 | Kneading Element KB45/5/16 N-3FE |
| 2 | Kneading Element KB45/5/16 3FE |
| 1 | Kneading Element KB45/5/16 3FE-N, |
| 1 | Kneading Element 90/5/16 |
| 1 | Conveying Element 24/24 |
| 2 | Conveying Element 16/16 |
| 1 | Spacer/1 |
| 1 | ZME 6/11 |
| 1 | Spacer/1 |
| 1 | Kneading Element KB45/5/8 |
| 1 | Conveying Element 16/8 LH |
| 1 | Conveying Element 24/24 |
| 2 | Kneading Element KB45/5/24 |
| 4 | Conveying Element 36/18 SK |
| 1 | Conveying Element 36/18 SK-N |
| 1 | Kneading Element KB45/5/24 |
| 1 | Kneading Element KB45/5/16 |
| 1 | Kneading Element KB45/5/8 |
| 1 | Conveying Element 24/12 |
| 1 | Conveying Element 24/24 |
| 1 | Kneading Element KB45/5/16 |
| 1 | Kneading Element KB45/5/8 |
| 1 | Spacer/1 |
| 1 | ZME 6/1 |
| 1 | Spacer/1 |
| 1 | Conveying Element 24/12 |
| 1 | Conveying Element 24/24 |
| 1 | Conveying Element 16/16 |

Temperature Zones:

| | Barrel | | | | | | | | | |
|---|---|---|---|---|---|---|---|---|---|---|
| | 1 | 2 | 3 | 4 | 5 | 6 | 7 | 8 | 9 | 10 |
| Temperature Zone | | 1 | | 2 | 3 | | 4 | 5 | 6 | 7 |
| T [° C.] | cooled | 170 | 160 | 160 | 170 | 190 | 200 | 200 | | |
| Throughput | 6 kg · h⁻¹ | | | | | | | | | |
| Screw speed | 600 min⁻¹ | | | | | | | | | |

An injection nozzle was placed downstream from the feeding and melting/plastification zone of the extruder. A screw element with a lower drift was placed directly upstream from the injection nozzle in order to increase the pressure at the point of injection and to reduce upstream flow of water towards the polymer feeding zone. Uncoated calcium carbonate was then fed into the extruder by injection of an aqueous slurry (Omyalite® 90-OM 74%) using said injection nozzle. Dosage and injection of the filler slurry were performed using a differential dosing scale (FD-DKM-3, Brabender, Germany) in combination with a single piston membrane pump (metering pump, LEWA, Germany) at a pressure of 20 to 25 bar. The solids content of the slurry was 74 wt.-% based on the total weight of the slurry. The water of the slurry was allowed to vaporize through a degassing vent of the polymer feeding zone, through a degassing vent of a side feeder and through a degassing zone at the downstream end of the extruder after slurry injection. The filler slurry was allowed to be sufficiently mixed with the polymer melt prior to discharging and granulation.

The following samples were obtained as pellets:

TABLE 3

Filler content, filter pressure values (FPV), ash content and moisture content inventive samples 7-9.

| | Sample No. | | |
|---|---|---|---|
| | 7 | 8 | 9 |
| Filler content [wt-%] | 10 | 30 | 60 |
| FPV [bar · g⁻¹] | 1.2 | 0.9 | 1.1 |
| Ash content [%] | 7.2 | 30.7 | 58.5 |
| Moisture content [ppm] | n. d. | n. d. | 964 |
| Extrusion simulation [bar] | n. d. | n. d. | 80 |

The filter pressure values (FPV) according to example 3 are reduced relative to example 1 which uses the identical filler type and filler contents.

Example 4—Manufacture of Press Plates

Pressed plates were produced from the above samples at 180° C. under active cooling by use of a 10 t press (Dr. Collin GmbH, Germany). The pressing time was 3 min and the thickness was 2 and 4 mm, respectively. In general, samples 7-9 appear less structured and more homogeneous as compared to samples 1-6

Example 5—Manufacture of Blown Film Samples

A blown film having a filler content of 15 wt.-% was produced using 74 wt.-% of LLDPE Dowlex™ NG 5056G and 26 wt.-% of a LLDPE polymer composition according to the above examples. Films were produced on a Dr. Collin blown film extrusion line (60 mm circular die, 1.2 mm die gap, 30 mm screw diameter, L/D ratio=30, screw with mixing element). The films were processed with a BUR (blow up ratio) of 2.2 and the frost line high was kept at 16 cm high (distance from die).

The extruder had the following configuration:

TABLE 4

| Extruder configuration. | | | | | |
|---|---|---|---|---|---|
| | Zone | | | | |
| | 1 | 2 | 3 | 4 | 5 |
| T [° C.] | 175 | 195 | 215 | 215 | 215 |

The following samples were prepared:

TABLE 5

| Filler content of blown film samples B1-B3. | | | |
|---|---|---|---|
| | Blown film sample | | |
| | B1 | B2 | B3 |
| Polymer composition sample | 3 | 6 | 9 |
| Polymer composition filler content [wt.-%] | 60 | 60 | 60 |
| Blown film final filler content [wt.-%] | 15 | 15 | 15 |

Extruder speed was kept constantly at 60 rpm and the average film grammage was set to 35 g/m² by appropriate adjustment of the line speed. Also the cooling air flow was adjusted accordingly to keep the frost line at the same position.

Example 6—Material and Mechanical Properties of Blown Film Samples

TABLE 6

| Material and mechanical properties of blown film samples B1-B3; | | | | |
|---|---|---|---|---|
| | | Blown film sample | | |
| | Direction[a] | B1 | B2 | B3 |
| Yield stress [N · mm$^{-2}$] | MD | 11.9 | 11.6 | 12.0 |
| | CD | 12.2 | 11.8 | 12.3 |
| Yield elongation [%] | MD | 12.5 | 11.1 | 11.1 |
| | CD | 9.2 | 8.2 | 9.4 |
| Stress at break [N · mm$^{-2}$] | MD | 44.0 | 48.4 | 50.6 |
| | CD | 41.8 | 43.5 | 45.5 |
| Force at break [N] | MD | 22.3 | 23.2 | 25.5 |
| | CD | 20.8 | 21.0 | 22.3 |

TABLE 6-continued

| Material and mechanical properties of blown film samples B1-B3; | | | | |
|---|---|---|---|---|
| | | Blown film sample | | |
| | Direction[a] | B1 | B2 | B3 |
| Elongation at break [%] | MD | 551 | 567 | 581 |
| | CD | 613 | 631 | 633 |
| Tensile modulus [N · mm$^{-2}$] | MD | 331 | 338 | 351 |
| | CD | 368 | 367 | 375 |
| Tear propagation resistance [cN] | MD | 673 | 633 | 640 |
| | CD | 868 | 798 | 875 |
| | Σ | 1541 | 1431 | 1515 |
| Dart drop fall weight [g] | — | 682 | 741 | 750 |

[a]MD = machine direction,
CD = cross direction.

In contrast to the powdered fillers (entries B1 and B2), the inventive polymer compositions produced by use of a filler slurry (entry B3) showed a better mineral dispersion, confirmed by visual analysis of films and by the lower increase of pressure during the extrusion simulation test. Moreover, improved mechanical film properties were found, such as, for example, dart drop fall weight, stress, force, and elongation at break. These results indicate a higher degree of mineral dispersion notwithstanding the absence of a filler coating.

The invention claimed is:

1. A process for producing a polymer composition, the process comprising the steps of:
   (a) providing a calcium carbonate containing mineral filler having a weight medium particle size $d_{50}$ in the range from 0.1 to 50 μm;
   (b) providing a polymer material; and
   (c) mixing the filler of step (a) and the polymer material of step (b) in an extruder to form a polymer composition comprising the filler of step (a) and the polymer material of step (b);
   wherein in the mixing of step (c), the polymer material is in at least a partially molten state and the filler is in a form of a slurry having a solids content in the range from 10 to 90 wt. %, based on the total weight of the filler slurry, the mixing takes place at a pressure above the vapour pressure of liquid in the filler slurry at the processing temperature the mixing takes place, and after mixing, liquid of the filler slurry vaporizes through one or more atmospheric or vacuum vents before discharge of the polymer composition from the extruder.

2. The process according to claim 1, wherein the filler slurry has a solids content in the range from 15 to 88.5 wt.-%, based on the total weight of the filler slurry.

3. The process according to claim 1, wherein the filler slurry has a solids content in the range from 20 to 78 wt.-%, based on the total weight of the filler slurry.

4. The process according to claim 1, wherein the filler is present in the polymer composition is an amount from 30 to 90 wt.-%, based on the total weight of the polymer composition.

5. The process according to claim 1, wherein the filler is present in the polymer composition is an amount from 5 to 85 wt.-%, based on the total weight of the polymer composition.

6. The process according to claim 1, wherein the filler is present in the polymer composition is an amount from 20 to 75 wt.-%, based on the total weight of the polymer composition.

7. The process according to claim 1, wherein the filler provided in step (a) comprises calcium carbonate and one or more of dolomite, barium sulfate, talc, kaolin, clay, mica, and titanium dioxide.

8. The process according to claim 1, wherein the filler provided in step (a) is calcium carbonate obtained from one or more of chalk, limestone and marble.

9. The process according to claim 1, wherein the filler provided in step (a) is a ground calcium carbonate (GCC), a precipitated calcium carbonate (PCC), a modified calcium carbonate (MCC), or any mixture thereof.

10. The process according to claim 1, wherein the filler provided in step (a) is precipitated calcium carbonate (PCC) that is ground prior to incorporation into the polymer material.

11. The process according to claim 1, wherein the filler provided in step (a) comprises a coated filler, an uncoated filler, or a mixture thereof.

12. The process according to claim 1, wherein the filler provided in step (a) comprises an uncoated filler.

13. The process according to claim 1, wherein the filler provided in step (a) comprises an uncoated calcium carbonate containing mineral filler.

14. The process according to claim 1, wherein the filler provided in step (a) has a weight median particle size $d_{50}$ in the range from 0.05 to 10 µm.

15. The process according to claim 1, wherein the filler provided in step (a) has a weight median particle size $d_{50}$ in the range from 0.07 to 5 µm.

16. The process according to claim 1, wherein the filler provided in step (a) has a weight median particle size $d_{50}$ in the range from 0.1 to 2.5 µm.

17. The process according to claim 1, wherein the filler provided in step (a) has a particle top cut $d_{98}$ in the range from 0.25 to 50 µm.

18. The process according to claim 1, wherein the filler provided in step (a) has a particle top cut $d_{98}$ in the range from 0.35 to 30 µm.

19. The process according to claim 1, wherein the filler provided in step (a) has a particle top cut $d_{98}$ in the range from 0.4 to 15 µm.

20. The process according to claim 1, wherein the polymer material provided in step (b) comprises a thermoplastic resin.

21. The process according to claim 1, wherein the polymer material provided in step (b) comprises a thermoplastic resin comprising a polyolefin.

22. The process according to claim 21, wherein the polyolefin is selected from the group consisting of homo- and/or copolymers of polyethylene, homo- and/or copolymers of polypropylene, homo- and/or copolymers of polybutylene, and any mixture thereof.

23. The process according to claim 1, wherein the extruder is a twin-screw extruder.

24. The process according to claim 1, wherein the extruder is a twin-screw extruder comprising screws that are co-rotating.

25. The process according to claim 1, wherein the extruder is a twin-screw extruder comprising screws that are counter-rotating.

26. The process according to claim 1, which is continuous.

* * * * *